US008347146B2

(12) United States Patent
Bell et al.

(10) Patent No.: US 8,347,146 B2
(45) Date of Patent: Jan. 1, 2013

(54) ASSISTING FAILURE MODE AND EFFECTS ANALYSIS OF A SYSTEM COMPRISING A PLURALITY OF COMPONENTS

(75) Inventors: John Brian Bell, Bristol (GB); Richard Lee Bovey, Bristol (GB)

(73) Assignee: BAE Systems PLC, London (GB)

( * ) Notice: Subject to any disclaimer, the term of this patent is extended or adjusted under 35 U.S.C. 154(b) by 0 days.

(21) Appl. No.: 12/304,885

(22) PCT Filed: Nov. 26, 2008

(86) PCT No.: PCT/GB2008/051116
§ 371 (c)(1),
(2), (4) Date: Jan. 21, 2009

(87) PCT Pub. No.: WO2009/077776
PCT Pub. Date: Jun. 25, 2009

(65) Prior Publication Data
US 2010/0262867 A1    Oct. 14, 2010

(30) Foreign Application Priority Data

Dec. 18, 2007  (GB) ............................... 0724593.9 A
Mar. 26, 2008  (GB) ............................... 0805464.5 A (51) Int. Cl.
*G06F 11/00*  (2006.01)
(52) U.S. Cl. ................... 714/37; 703/9; 703/16; 703/21
(58) Field of Classification Search ................. 703/9, 16, 703/21; 714/37
See application file for complete search history.

(56) References Cited

U.S. PATENT DOCUMENTS

| 4,965,743 | A | | 10/1990 | Malin et al. | |
|---|---|---|---|---|---|
| 5,109,380 | A | * | 4/1992 | Ogino | 714/26 |
| 6,453,209 | B1 | * | 9/2002 | Hill et al. | 700/95 |
| 7,082,384 | B2 | * | 7/2006 | Sasaki et al. | 702/184 |
| 7,162,695 | B2 | * | 1/2007 | Zemore et al. | 715/709 |
| 7,254,747 | B2 | * | 8/2007 | Osborn et al. | 714/37 |
| 7,337,090 | B1 | * | 2/2008 | Yemini et al. | 702/183 |

(Continued)

FOREIGN PATENT DOCUMENTS
EP    1 544 771 A1    6/2005
(Continued)

OTHER PUBLICATIONS

Picardi et al., "AUTAS: a tool for supporting FMECA generation in aeronautic systems" Proceedings of the 16th European Conference on Artificial Intelligence, [online] Aug. 22, 2004, Aug. 27, 2004, pp. 1-5, XP-002567209.

(Continued)

*Primary Examiner* — Joshua P Lottich
(74) *Attorney, Agent, or Firm* — Buchanan Ingersoll & Rooney PC (57) ABSTRACT

A method of assisting failure mode and effects analysis of a system having a plurality of components includes obtaining data associated with a component, or a group of components, of the system. The component or the group is associated with component type data or group type data, respectively, that includes data relating to at least one failure feature common to all components or groups, respectively, of that type. The component/group data and the component/group type data can then be stored and/or transferred for use in a failure mode and effects analysis of the system.

19 Claims, 4 Drawing Sheets

U.S. PATENT DOCUMENTS

| | | | |
|---|---|---|---|
| 7,627,388 B2 * | 12/2009 | August et al. | 700/79 |
| 7,725,849 B2 * | 5/2010 | Abercrombie et al. | 716/136 |
| 7,937,679 B2 * | 5/2011 | Mariani | 716/104 |
| 2003/0004679 A1 | 1/2003 | Tryon, III et al. | |
| 2003/0135786 A1 * | 7/2003 | Vollmar et al. | 714/25 |
| 2004/0193958 A1 * | 9/2004 | Shah et al. | 714/37 |
| 2005/0028045 A1 * | 2/2005 | Kawaike | 714/47 |
| 2005/0240732 A1 * | 10/2005 | Crick et al. | 711/133 |
| 2007/0033439 A1 * | 2/2007 | Selvage | 714/26 |
| 2007/0150772 A1 * | 6/2007 | Berenbach et al. | 714/25 |
| 2008/0034258 A1 * | 2/2008 | Moriya et al. | 714/57 |
| 2008/0097621 A1 * | 4/2008 | Tasker et al. | 700/1 |
| 2008/0141072 A1 * | 6/2008 | Kalgren et al. | 714/33 |
| 2008/0300888 A1 * | 12/2008 | Dell'Anno et al. | 705/1 |
| 2009/0106593 A1 * | 4/2009 | Bluvband et al. | 714/37 |
| 2009/0113247 A1 * | 4/2009 | Gofuku et al. | 714/37 |
| 2010/0138028 A1 * | 6/2010 | Tasker et al. | 700/117 |

FOREIGN PATENT DOCUMENTS

| | | |
|---|---|---|
| GB | 2 378 248 A | 2/2003 |
| GB | 2 427 726 A | 1/2007 |
| GB | 2 433 134 A | 6/2007 |
| WO | WO 01/31448 A1 | 5/2001 |

OTHER PUBLICATIONS

International Search Report and the Written Opinion of the Searching Authority (Forms PCT/ISA/210 and PCT/ISA/237) issued in the corresponding International Application No. PCT/GB2008/051116 dated Feb. 23, 2010.

United Kingdom Search Report dated Mar. 18, 2008.

Srikesh G. Arunajadal et al., "Failure Mode Identification Through Clustering Analysis", Quality and Reliability Engineering International Journal, 2004, vol. 20, pp. 1-13.

* cited by examiner

ASSISTING FAILURE MODE AND EFFECTS ANALYSIS OF A SYSTEM COMPRISING A PLURALITY OF COMPONENTS

The present invention relates to assisting failure mode and effects analysis of a system comprising a plurality of components.

Failure mode and effects analysis is a technique that is used to create a fault-symptom model that can be used to identify the most likely faults in a system using data about the known symptoms and their relationships to known failures. Expert system diagnostic applications (e.g. ones based on probabilistic Bayesian networks) can then use the model to identify the likely cause, given information about the symptoms. The construction of a model defining relationships between faults and associated symptoms has conventionally required expert knowledge of both the system and the analysis technique and is a repetitive, manual exercise. In some cases a data representation such as a spreadsheet may be used to create the model and this requires the user to perform many copy/paste operations and results in a large amount of repeated data. Further, the large amount of model data that is created by these conventional methods is susceptible to failing to be properly updated throughout when the model is updated.

Embodiments of the present application are intended to address at least some of the problems discussed above.

According to one aspect of the present invention there is provided a method of assisting failure mode and effects analysis of a system comprising a plurality of components, the method including:

obtaining data associated with a component, or a group of components, of a system;

associating the component or the group with component type data or group type data, respectively, that includes data relating to at least one failure feature common to all components or groups, respectively, of that type, and storing and/or transferring the component/group data and the component/group type data for use in a failure mode and effects analysis of the system.

The step of obtaining data associated with a component of a system may include analysing a model of the system, or analysing creation of a model of the system, to determine if the component is already associated with a said component type data, and if the component is not already associated with a said component type data then component type data for the component is created and associated with the component.

The step of analysing (creation of) a model of the system may include detecting a shape of a graphical representation of the component in the model, and determining a master or template upon which the shape is based to determine the component type data to be associated with the component.

The failure feature data may be selected from a set: type/name/mode of the failure; effect(s) of the failure on the system and/or other components; symptom(s) of the failure; a value representing a probability of the failure symptom(s) leading to the failure occurring; a prior probability of the failure occurring; a conditional probability of a symptom given one (and only one) said failure; a probability of a symptom given absence of any modelled failure.

The component/group type data may be stored independently of the component/group data. The component/group data may include, or be associated with, data relating to failure features of that specific component/group, typically data describing effect(s) of the failure of the component/group on other components and/or other groups and/or the system.

Each said component in the model may be assigned a unique identifier and each said component type may be assigned a unique identifier. The step of storing and/or transferring the component and component type data may include storing/transferring the component data with a reference between the unique identifier of the component and the unique identifier of the component type associated with the component.

A graphical part of the model of the system may be a Microsoft Visio™ model and the step of detecting a shape representing a said component may be implemented by detecting an "add shape" event in Visio. The event may be detected using code implemented as a Visio™ Add-on.

According to another aspect of the present invention there is provided a computer program product comprising computer readable medium, having thereon computer program code means, when the program code is loaded, to make the computer execute a method of assisting failure mode and effects analysis of a system comprising a plurality of components substantially as described herein.

According to a further aspect of the present invention there is provided apparatus adapted to assist failure mode and effects analysis of a system comprising a plurality of components, the apparatus including:

a device adapted to obtain data associated with a component of a system;

a device adapted to associate the component with component type data that includes data relating to at least one failure feature common to all components of that component type, and a device for storing and/or transferring the component and component type data for use in a failure mode and effects analysis of the system.

At least one said component of the system may be configured to (automatically) adapt itself based on a result of the failure mode and effects analysis.

According to yet another aspect of the present invention there is provided a system comprising a plurality of components, the system being adapted/adaptable as a result of failure mode and effects analysis substantially as described herein. According to another aspect of the present invention there is provided a method of creating a failure-symptom model substantially as described herein. According to a further aspect of the present invention there is provided a model of a system (or a system model that describes relationships between faults and symptoms of failure of components in the system) produced using a method substantially as described herein.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

The invention may be performed in various ways, and, by way of example only, embodiments thereof will now be described, reference being made to the accompanying drawings in which.

An overview of the stages typically involved in creating a fault/symptom model will now be given. First, a description of the system of interest is created. Like the other stages, the description-creating stage can be at least partially automated using computer software, e.g. using a tool such as Microsoft Visio™ to draw a model of the components of the system and the relationships between them. The second stage can involve identifying states and failure modes of the system components. For example, in a pump tray apparatus the components may comprise a tank and a failure state that can be associated with that valve is "leakage". The identification of the failure modes may be based on the knowledge of at least one expert. Next, a table (or any other suitable data structure) is created that stores information describing the symptom(s) associated with each failure mode. Again, this will typically be based on expert knowledge, which can be obtained from experience of actually building the system being modelled. The fourth stage involves generating a failure mode/symptoms matrix containing values representing the probability of a particular symptom causing the failure mode. The next stage is to validate the table and the results of the validation can be used to modify the table. This can involve comparing the table against a test rig or in-service data that provides a list of faults and their associated symptoms. Unit tests may be created (e.g. using a tool such as Matlab™ by The MathWorks of Natick, Mass., USA) and utilised to check that the diagnostic tool identifies the correct fault when the symptoms are added to the tool. When a large model is being processed then a set number of faults may be selected to validate the table, but all the faults may be tested with a smaller model.

Figure 1:
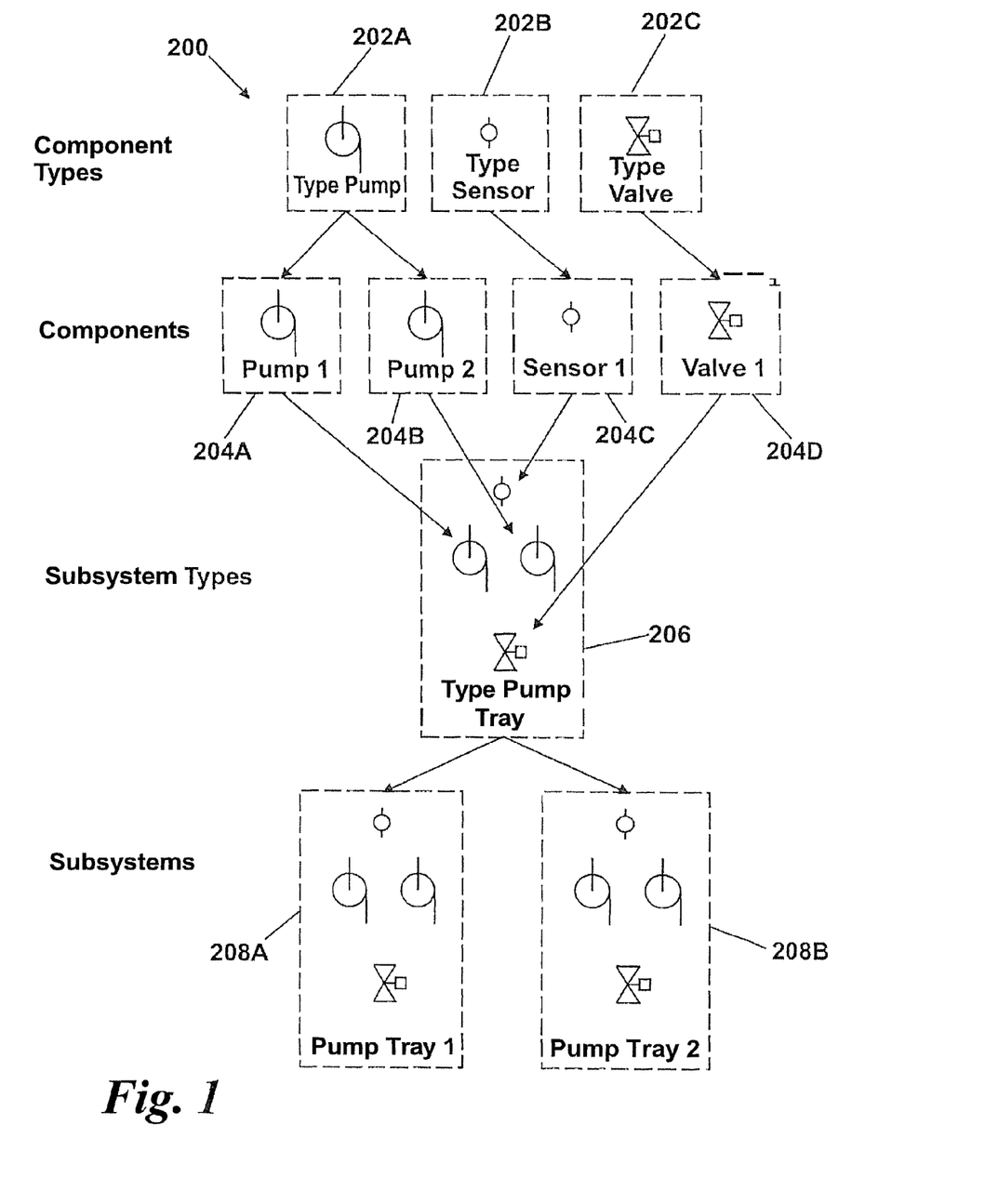
FIG. 1 is a schematic drawing showing relationships between components in an example system.

As mentioned above, an early stage in the model creation process involves creating a description of the system. FIG. 1 illustrates schematically a system that has been decomposed into a hierarchy 200. The example is a pump tray system comprising two identical pump tray subsystems. Three different types of components can be used to generalise all of the individual components of this example system: a pump type 202A, a sensor type 202B and a valve type 202C. In the example pump tray subsystem there are two instances of the pump type devices, 204A, 204B; one instance of a sensor 204C, and one instance of a valve 204D. The subsystem itself that comprises these components can be identified as a general subsystem type 206. Instances of the two subsystem types 208A, 208B are shown at the bottom of the diagram. Thus, it will be appreciated that in any system that is to be modelled the components/subsystems of the model can be divided into type data and instance data.

For the creation of a fault/symptom model, the type data can include (e.g. the type data structure can include appropriate field(s)) or be associated with (e.g. a separate data structure may be used to actually contain the information) information describing failure feature(s) that is/are common to all components/subsystems of the same type. Further, the instance data can include/be associated with data describing local failure effects, which may differ for different instances because it is may depending upon the particular neighbouring elements.

Figure 2:
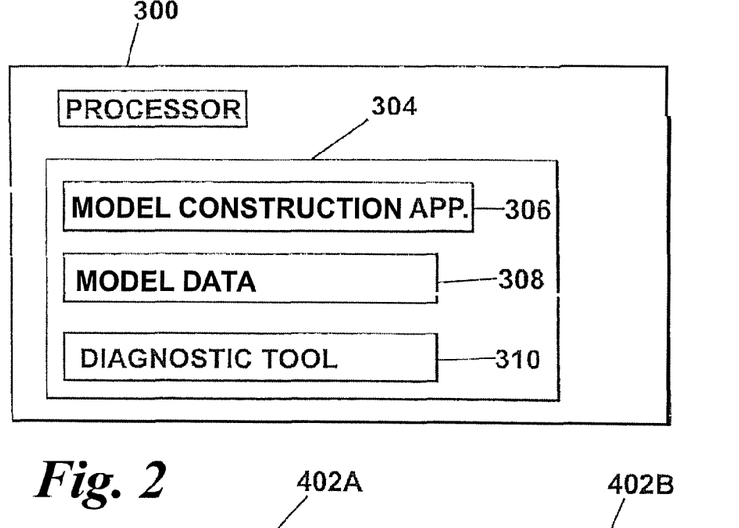
FIG. 2 is a schematic drawing showing a computing device configured to generate a fault/symptom model and perform failure mode and effects analysis based on the model.

In the example described herein a software application having a graphical user interface is used to help construct a fault/symptom model that can then be used by a diagnostic tool to identify the likely cause of a given set of symptoms in the system. FIG. 2 is a schematic illustration of a computing device 300 that has been configured to perform these tasks. The computer 300 includes a processor 302 and an internal memory 304. It will be understood that the computer can include other conventional features, such as a display, user input devices (e.g. a mouse/keyboard), an external memory and network connections. The memory 304 stores code including a model construction application 306 that is used to create data representing a fault/symptom model 308 and a diagnostic tool 310 that can use the model data.

In the example described herein the model construction application 306 comprises Microsoft Visio™ 2003 or 2007 Professional; however, it will be understood that other suitable drawing packages, such as SmartDraw™ by smartdraw.com or Kivio™ by koffice.org, may be used/adapted. Microsoft Visio™ is a vector drawing package often used to create flow charts, diagrams and floor plans. Like most vector graphics packages, shapes can be created from primitive objects, but Visio™ includes various predefined shapes called "masters" in sets called "stencils". Multiple stencils can be loaded alongside a drawing/document, allowing the user to drag and drop from a master onto the drawing, which adds a master instance called a "shape". Visio™ creates a link between master and shapes; if any changes are made to the master, the shape is updated. Paper schematics may be scanned in and the image pasted as a background to a Visio™ document. The user can then draw shapes on top as if they were tracing and this can assist the transfer of data from paper to electronic format. Thus, Visio™ is a suitable tool for creating schematic drawings representing components/subsystems that form a system that is to be modelled.

Shape data can be associated with any shape, including the shapes that make up masters by using the "Edit Master Shape" feature that allows the user to input data into predefined fields. It is also possible to change the fields using a "Define" button, which allows sets of data fields to be created and dropped onto a shape, enabling multiple shapes to have the same shape data fields. This "shape data" facility was contemplated for associating failure feature data with the components/subsystem being modelled. However, while the present inventors were experimenting with creating subsystems of systems using Visio™, a limitation of that application was discovered. When a subsystem is grouped and created into a master (i.e. the group dragged from the document to the stencil), the links from shapes within the subsystem to their original masters are lost. This prevents the user from tracking all instances of a master within the document.

Normally (i.e. without grouping), if the master valve is changed, each instance of valve on the document is also updated. For example, a user may change all the valves in an example system to be shown in red by amending that feature using the "shape data" dialogue box. However, it was found that when, for instance, the colour of the valve master is changed to red, it does not update the valve shapes within subsystems; that is, the valve shapes within the subsystems no longer link to the master valve in the stencil. This demonstrated that merely attempting to use Visio™ shape data for creating/storing fault feature information to be associated with component/subsystem types would be problematic.

In view of the problem relating to a tool designed for the technical purpose of simulating/fault-finding in a hardware system that they identified, the present inventors decided to extend the functionality of Visio™ to allow failure feature data to be accurately associated with system components/subgroups. The inventors found that the most convenient way of achieving this by means of a Visio™ "add-on", but it will be appreciated by those skilled in the art that alternatives exist, e.g. by using Visual Basic™ for Applications (VBA). Visio™ add-ons allow users to extend the functionality of the application by developing software tools that are permitted extensive access to the Visio™ application. An add-on can be written in any language (e.g. C++, C#, VB or VB.NET) that supports the Component Object Model (COM). For one embodiment, C++ code was written that was partly based on code included in the "flowchart" example included in the Visio™ 2003 software development kit. The code includes functionality to "catch" persistent events in the execution of Visio™. When the add-on runs it checks if the active document is currently being monitored; if not then it creates an event sink and adds it to a document wrapper, the event sink checks for events. This is useful for detecting when a new shape is being added to the drawing, which, as will be described below, can result in the creation/cross-referencing of component type data.

The Visio™ terms "masters" and "shapes" can be loosely equated with types and instances, respectively. Herein the terms "component type" and "component" denote a type of component and an instance of a component, respectively (e.g. a pump type and a specific instance of a pump, such as pump number 4) as dealt with by the add-on. In the example add-on, data describing a component includes the component name, a description of the component and an indication of the type of the component. However, it will be understood that different/additional data could be used for a component. The component type data includes type name and description.

Figure 3:
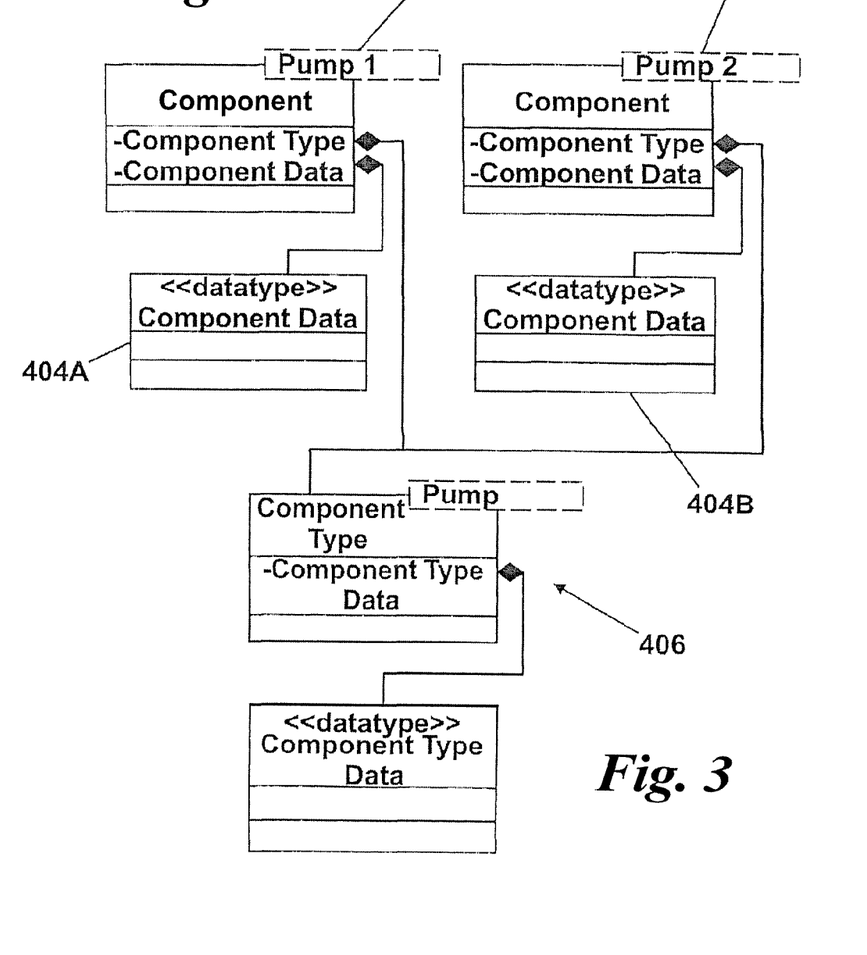
FIG. 3 is a schematic illustration of component data and component type data used by an embodiment.

FIG. 3 graphically illustrates the relationship between component data and component type data. In the example Figure, there are two (instances of) components, Pump 1 (402A) and Pump 2 (402B). Each of these is associated with component data 404A, 404B, respectively. Each component 402A, 402 is also associated with a single component type data 406 (because both components are of the same type, i.e. pumps). In the example, the component type data 406 includes data describing failure modes and effects that are common to all components of that type and are shared by every instance of that component. The component data 404A and 404B include a list of local effects for pumps 402A and 402B, respectively, e.g. effects specific to directly neighbouring components of each pump. It will be understood the data can be stored and manipulated using any suitable data structure, e.g. a simple table, a tree, etc.

Figure 4:
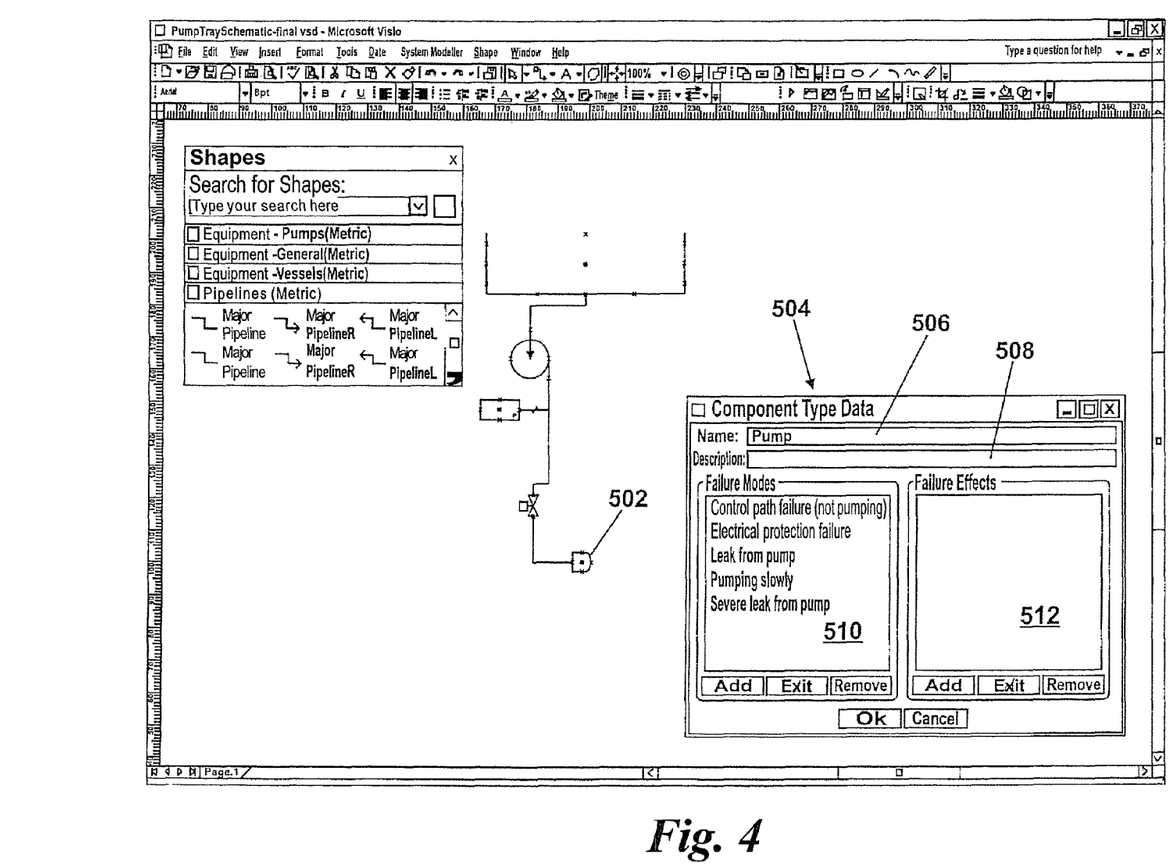
FIG. 4 is an example screen display generated by an application used to create a fault/symptom model.

An example of the creation of a model using Visio™ and an embodiment of the add-on will now be described. It will be understood that some of the operations described below may be performed in a different order or that some may be omitted, depending on the particular model being created. First, a new document for the model can be created and stencils (e.g. based on the ones found in the Process Flow Diagram Template supplied with Visio™ Professional 2007) containing the necessary shapes can be opened. An image of a schematic of the system to be opened can be pasted into the drawing. To allow new components to be seen clearly, the transparency of the pasted image may be altered. FIG. 4 is an example of a Visio™ screen display showing such a pasted image (shown in feint lines) with some components drawn using Visio™ (shown in darker lines, e.g. pump shape 502) superimposed upon it.

Once the schematic has been drawn on top of the transparent drawing failure mode and effect data can be added to the components. It will be appreciated that this could be done at any time during or after the drawing of the components of the system, e.g. by selecting a menu option, but in the example the add-on detects an "add shape" event and may prompt failure data entry for a new component. If the component is of a new type then failure data entry for that component type is prompted.

Referring to the example of FIG. 4, a data entry box 504 is shown for entering data relating to the type of the pump component 502. The box allows a name 506 of the component type to be entered as well as a description 508 of the component type. A list of failure modes 510 common to all components of the types is also present, as well as list of failure effects 512 common to all components of the types. Entries in these lists can be added, edited or deleted using the appropriate buttons. Example failure modes have been entered in the Figure. It will be appreciated that further data will be added to complete the fault/symptom model. This may be done by exporting the partial data entered via the add-on, e.g. as a comma separated variable file, and adding to that data using another application, e.g. a spreadsheet. Alternatively, the data entry box in the add-on may be expanded to allow additional failure/effect data to be entered. For instance, a component (instance rather than type) data entry box may be provided for entering component-specific failure data. Further, it will be appreciated that groups of components can be identified as subsystems and subsystem type data can be created and manipulated in a similar manner to the component/component type data detailed herein. The table below illustrates a further partial example of failure feature information that can be captured for a system:

| Component | Failure Mode | Failure Prob. | Failure Effect | System Effect | Probability of Symptom given only one failure | Leaks |
| --- | --- | --- | --- | --- | --- | --- |
| Main tank | Leakage | 0.00328 | Fluid escape | Pressure monitor PT3 indicates high pressure | 0.9 | 0.01 |
| Pipe between valve and | Blocked | 0.00328 | Loss of flow | Valve SOV3 commanded | 0.88 | 0.02 |

-continued

| Component | Failure Mode | Failure Prob. | Failure Effect | System Effect | Probability of Symptom given only one failure | Leaks |
|---|---|---|---|---|---|---|
| conjunction | | | | OPEN but closed switch responding CLOSED | | |
| Valve SOV3 | Valve SOV3 close switch failed set | 0.00329 | — | Valve SOV3 is open, but Valve SOV4 is shut | — | — |
| | Valve SOV3 close switch failed unset | 0.00327 | — | Valve SOV3 commanded OPEN but open switch is no responding OPEN | — | — |
| | Valve SOV3 control path failure (valve remains closed) | 0.00328 | — | Valve SOV3 commanded OPEN but closed switch responding CLOSED | — | — |
| — | — | — | — | — | — | — |

Every master and shape in Visio™ has a unique identifier that can be used to track an instance of a shape. Masters also have a unique ID allowing common masters to be identified. Constructing a map of components and component types indexed by the unique ID prevents data duplication and allows fast access to the data. Thus, the data collected by the add-on can be exported (in any suitable format) and can be directly used by the diagnostic fault-finding application. The system being modelled may be (automatically) adapted based on the findings of the diagnostic tool, e.g. open an emergency valve.

Figure 5:
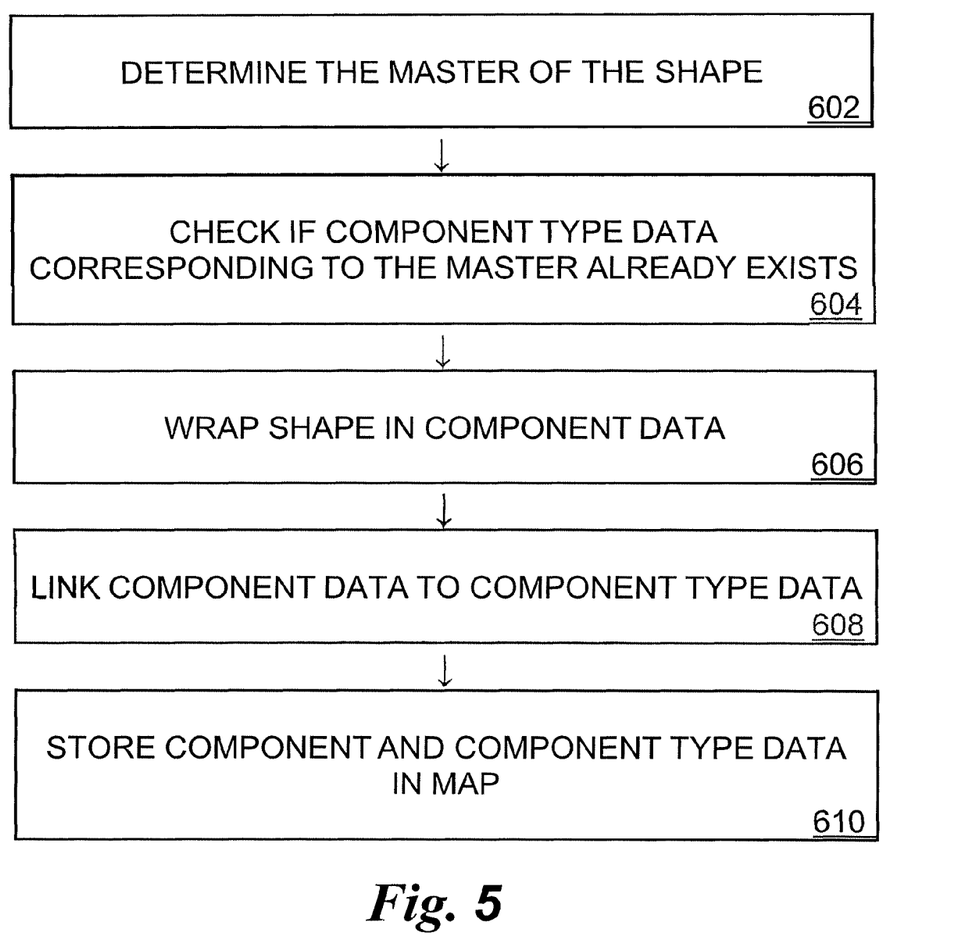
FIG. 5 is a flowchart that illustrates steps performed by the embodiment when a new component is added to a model.

FIG. 5 illustrates schematically steps performed by the add-on when it catches an "add shape" event, i.e. when a new component has been drawn. At step 602 the master of the shape drawn is determined. At step 604 a question is asked whether component type data corresponding to that master already exists. If the answer is negative then component type data for the component represented by the shape is created, e.g. via a data entry box as described above. The component type data is then stored in the map maintained by the add-on.

At step 606 the shape is wrapped in/associated with component data to allow the add-on to recognise it as a component. At step 608 a link is created from the component to the component type and at step 610 this information is stored in the map of the add-on. Thus, data representing a list of components and component types (with associations between each component and the appropriate type) is created and can be stored/transferred for use with a diagnostic tool as described above. As the add-on allows components of the same type to share data, repetitive data input is avoided and this can reduce the likelihood of mistakes. Data created by the application can be stored as a "library" for re-use. Changes to the data can be made quickly and conveniently by finding the relevant shape on the drawing, instead searching lines of characters as in text-based model data construction techniques. The "add selected" feature allows existing schematics drawn in Visio™ to be used without the need to re-draw an entire diagram.

The invention claimed is:

1. A method of assisting failure mode and effects analysis of a system having a plurality of components, the method comprising:
    obtaining data associated with at least one component and a group that includes the at least one component of the system;
    associating the at least one component with component type data and the group that includes the at least one component with group type data, wherein each of the component type data and the group type data include data relating to at least one failure feature common to each instance of the at least one component and the group that includes the at least one component associated with a respective type; and
    at least one of storing and transferring data of the at least one component, data of the group that includes the at least one component, component type data, and group type data for use in a failure mode and effects analysis of the system,
    wherein the data relating to the at least one failure feature includes a prior probability of the failure occurring, and at least one of a conditional probability of a symptom given one said failure, and a probability of a symptom given absence of any modeled failure.

2. The method according to claim 1, wherein the step of obtaining data associated with at least one component of the system includes analysing a model of the system to determine if the at least one component is already associated with said component type data, and if the at least one component is not already associated with said component type data then component type data for the at least one component is created and associated with the at least one component.

3. The method according to claim 2, wherein the step of analysing the model includes:
   detecting a shape of a graphical representation of the at least one component in the model; and
   determining a master or template upon which the shape is based to determine the component type data to be associated with the at least one component.

4. The method according to claim 3, wherein a graphical part of the model of the system is created using Microsoft Visio™ and the step of detecting a shape representing the at least one component is implemented by an add-on configured to detect an "add shape" event in Visio™.

5. The method according to claim 1, wherein failure feature data is also selected from at least one of a type/name/mode of a failure; an effect of the failure on at least one of the system and other components; a symptom of the failure; and a value representing a probability of the failure symptom leading to the failure occurring.

6. The method according to claim 1, wherein the component type data and the group type data are stored independently of the data of the at least one component and the data of the group that includes the at least one component, respectively.

7. The method according to claim 1, wherein the component type data and the group type data include, or are associated with, data describing an effect of the failure of the respective component and the group that includes the respective component on at least one of other components, other groups, and the system.

8. The method according to claim 1, wherein each component in the model is assigned a unique identifier and each component type is assigned a unique identifier and the step of at least one of storing and transferring the component and component type data includes at least one of storing and transferring the component data with a reference between the unique identifier of a respective component and the unique identifier of a respective component type associated with the respective component.

9. A computer program product including a non-transitory computer readable medium, having recorded thereon computer program code, wherein when the computer program product is loaded into a computer the computer executes a method of assisting failure mode and effects analysis of a system having a plurality of components, the method comprising:
   obtaining data associated with at least one component and a group that includes the at least one components of the system;
   associating the at least one component with component type data and the group that includes the at least one components with group type data, wherein each of the component type data and the group type data include data relating to at least one failure feature common to each instance of the at least one component and the group that includes the at least one component associated with a respective type; and
   at least one of storing and transferring the data of the at least one component, the data of the group that includes the at least one component, the component type data, and the group type data for use in a failure mode and effects analysis of the system,
   wherein the data relating to the at least one failure feature includes a conditional probability of a symptom given one said failure and at least one of a prior probability of the failure occurring, and a probability of a symptom given absence of any modeled failure.

10. The computer program product of claim 9, wherein during execution of the method failure feature data is selected from at least one of a type/name/mode of a failure; an effect of the failure on at least one of the system and other components; a symptom of the failure; and a value representing a probability of the failure symptom leading to the failure occurring.

11. The computer program product of claim 9, wherein during execution of the method the component type data and the group type data are stored independently of the data of the at least one component and the data of the group that includes the at least one component, respectively.

12. The computer program product of claim 9, wherein during execution of the method the component type data and the group type data are stored independently of the data of the at least one component and the data of the group that includes the at least one component, respectively.

13. The computer program product of claim 9, wherein during execution of the method the component type data and the group type data include, or are associated with, data relating to failure features of a respective component and a group that includes the respective component, which includes data describing an effect of the failure of the respective component and the group that includes the respective component on at least one of other components, other groups, and the system.

14. The computer program product of claim 9, wherein during execution of the method the component type data and the group type data include, or are associated with, data relating to failure features of a respective component and a group that includes the respective component, which includes data describing an effect of the failure of the respective component and the group that includes the respective component on at least one of other components, other groups, and the system.

15. The computer program product of claim 14, wherein during execution of the method each component in a model is assigned a unique identifier and each component type is assigned a unique identifier and the step of at least one of storing and transferring the component and component type data includes at least one of storing and transferring the component data with a reference between the unique identifier of a respective component and the unique identifier of a respective component type associated with the respective component.

16. The computer program product of claim 15, wherein during execution of the method a graphical part of the model of the system is created using Microsoft Visio™ and detecting a shape representing the at least one component is implemented by an add-on configured to detect an "add shape" event in Visio™.

17. The computer program product of claim 9, wherein during execution of the method each component in a model is assigned a unique identifier and each component type is assigned a unique identifier and the step of at least one of storing and transferring the component and component type data includes at least one of storing and transferring the component data with a reference between the unique identifier of a respective component and the unique identifier of a respective component type associated with the respective component.

18. The computer program product of claim 9, wherein during execution of the method a graphical part of a model of the system is created using Microsoft Visio™ and detecting a shape representing the at least one component is implemented by an add-on configured to detect an "add shape" event in Visio™.

19. An apparatus adapted to assist failure mode and effects analysis of a system having a plurality of components, the apparatus comprising:
   a device adapted to obtain data associated with at least one component and a group that includes the at least one component of the system;
   a device adapted to associate the at least one component with component type data and the group that includes the at least one component with group type data, wherein each of the component type data and the group type data include data relating to at least one failure feature common to each instance of the at least one component and the group that includes the at least one component associated with a respective type; and
   a device for at least one of storing and transferring the data of the at least one component, the data of the group that includes the at least one component, the component type data, and the group type data for use in a failure mode and effects analysis of the system,
   wherein the data relating to the at least one failure feature includes a probability of a symptom given absence of any modeled failure and at least one of a conditional probability of a symptom given one said failure, and a prior probability of the failure occurring.

* * * * *